(12) United States Patent
Wright et al.

(10) Patent No.: US 6,328,074 B1
(45) Date of Patent: Dec. 11, 2001

(54) PIPE FOR CONVEYING FLUIDS SUCH AS PETROLEUM PRODUCTS

(75) Inventors: Wayne Clifton Augustus Wright, Kent; John Alexandre Boudry, Brettenham, both of (GB)

(73) Assignee: Petrotechnik Limited (GB)

( * ) Notice: Subject to any disclaimer, the term of this patent is extended or adjusted under 35 U.S.C. 154(b) by 0 days.

(21) Appl. No.: 09/341,537

(22) PCT Filed: Nov. 13, 1998

(86) PCT No.: PCT/GB98/03422

§ 371 Date: Sep. 9, 1999

§ 102(e) Date: Sep. 9, 1999

(87) PCT Pub. No.: WO99/26007

PCT Pub. Date: May 27, 1999

(30) Foreign Application Priority Data

Nov. 13, 1997 (GB) .................................................. 9723830
Nov. 13, 1997 (GB) .................................................. 9723833

(51) Int. Cl.⁷ ....................................................... F16L 11/00
(52) U.S. Cl. ........................... 138/137; 138/114; 138/149; 138/148
(58) Field of Search ................................... 138/114, 113, 138/112, 148, 104, 149, 137, 115, 116, 117

(56) References Cited

U.S. PATENT DOCUMENTS

| 2,756,032 | * | 7/1956 | Dowell | 138/114 X |
| 3,126,918 | * | 3/1964 | Eaton | 138/114 X |
| 3,882,382 | * | 5/1975 | Johnson | 138/104 X |
| 4,274,549 | | 6/1981 | Germain | 138/113 X |
| 4,939,923 | | 7/1990 | Sharp | 73/40.5 R |
| 5,343,738 | | 9/1994 | Skaggs | 138/113 X |
| 5,497,809 | | 3/1996 | Wolf | 138/113 |
| 5,546,992 | * | 8/1996 | Chick et al. | 138/104 X |
| 5,865,216 | * | 2/1999 | Youngs | 138/114 X |
| 5,971,029 | * | 10/1999 | Smith et al. | 138/114 X |
| 6,032,699 | * | 3/2000 | Cochran et al. | 138/104 |

FOREIGN PATENT DOCUMENTS 9329372    10/1993   (EP) .

* cited by examiner

*Primary Examiner*—Patrick Brinson
(74) *Attorney, Agent, or Firm*—Calgano & Burke

(57) ABSTRACT

A flexible secondarily-contained pipe of unitary or one-piece construction characterized in that it comprises the following combination of features: an inner supply pipe (1); an inner barrier layer (6) which forms an internal surface of the supply pipe (1) and which is formed from a first polymeric plastics material, an outer containment pipe (2); a plurality of passages associated with the secondary containment pipe, said passages being adapted to receive any fluid which has leaked from the inner supply pipe and to convey said fluid to a remote leak detector.

10 Claims, 2 Drawing Sheets

PIPE FOR CONVEYING FLUIDS SUCH AS PETROLEUM PRODUCTS

FIELD OF THE INVENTION

This invention relates to a pipe for conveying fluids. It is particularly applicable, but in no way limited to pipes for conveying organic fluids such as (for example) petroleum products. Such pipes may be used to convey petrol from a reservoir to a dispensing pump and a filling station. The invention also relates to a system for dispensing petrol.

BACKGROUND OF THE INVENTION

The use of dual containment piping systems in which an inner supply pipe is co-axially placed within an outer secondary containment pipe is known and accepted commercial practice. Typically, such systems are found in the nuclear, oil and gas, petroleum refining and chemical processing industries. The supply pipe is used to transport hazardous or toxic fluid while the secondary containment pipe is used to contain leakage from the supply pipe should it occur. It is also known to provide leakage detectors and drainage systems within the annulus between the carrier and containment pipes.

In the design of petroleum forecourt installations, it is regarded as increasingly important to contain and detect any leaks of petrol or diesel fuel from subterranean pipes which connect one or more storage tanks to dispensing pumps in the installation. To that end, many current designs of forecourt installation utilise secondary containment. This involves containing each fuel supply pipeline in a respective secondary containment pipeline which is optionally sealed at its ends to the fuel supply pipeline. The secondary containment pipeline prevents leaks from the fuel supply pipeline from being discharged into the environment, and also can convey leaked petrol to a remote-sensing device. Typically, the pipes forming the secondary containment pipeline are initially separate from the fuel pipes and are sleeved over the latter as the fuel pipes are installed between the fuel storage tanks and dispensing pumps.

A wide variety of secondary containment systems are available. Examples are the ENVIROFLEX™ piping system available from Total Containment Inc of Exton PA USA and the PERMA-FLEXX™ system available from Containment Technologies Corporation Minneapolis USA. A further example is the UPP™ pipework system available from PetroTechnik Limited. These systems all share certain common features. Firstly, the primary supply pipe and the secondary containment pipe are of a different construction. Furthermore, they are each available in a range of different diameters to suit different applications. This has the disadvantage that it requires different manufacturing plant to produce each product, primary and secondary, and a substantial amount of stock is required if orders are to be satisfied quickly. Pipe is very bulky to store and thus takes up a great deal of expensive warehousing space.

Such systems therefore require twice as much piping as systems which have no secondary containment, thus increasing the costs of storage and transportation of the components for a forecourt installation. The installation of the secondary containment pipeline increases the amount of time, and hence the cost, of assembling the forecourt installation. In addition, when installing such a system, it can be difficult to ensure that the fuel supply pipes remain spaced from the secondary containment pipes and do not block the passage of leaked fuel to a leak detection system.

Certain types of integral secondarily-contained pipe are known. For example,

GB1326512 (Institut Francais Du Petrole Des Carburants Et Lubricants) describes an inner pipe separated from an outer envelope by a butyl rubber or other type of foam. According to this specification, the foam will expand on contact with any leaked hydrocarbons from the inner pipe so as to seal that pipe. The foam would not therefore appear to be capable of conveying any leaked liquids to a remote sensor. GB1141014 (Samuel Moore & Company) describes a pipe assembly having an inner metal pipe and a heating line running parallel to and along side it, the whole being contained in an outer casing. Fibrous filler material packs the space between the two inner pipes. The fibrous fillers described would absorb any leakage from the primary pipe rather than conveying it to a remote sensor.

U.S. Pat. No. 4,657,050 (Shell Oil Company) illustrates a pipe for conveying hydrocarbons from an offshore location. A steel inner tube runs through a high density plastic sheath formed with circumferential ribs over which a further layer is sleeved. The gaps between the ribs are filled with a foam but the ribs prevent leaked liquid from being conveyed along the pipe. A similar problem exists in the type of pipe disclosed in U.S. Pat. No. 4,644,977 (The Gates Rubber Company) which describes a hose which is formed by co-extrusion and has a foamed layer separating inner and outer non-foamed layers. The foaming process described causes a closed cell foam to form consisting of tiny closed air pockets. Such a foam would positively hamper the progress of any leaked liquid along the pipe.

GB1185062 (Francesco Steffenini) describes a pipe with a one-piece wall having an inner and outer surface, the surfaces being spaced apart by integral helical ribs. The helical arrangement of these ribs provides a positive impediment to the passage of any leaked fluid along the pipe to a remote sensor since any fluid has to make many revolutions of the pipe before reaching an end.

SUMMARY OF THE INVENTION

According to a first aspect of the present invention there is provided a flexible secondarily-contained pipe of unitary or one-piece construction characterised in that it comprises the following combination of features:

(i) an inner supply pipe;
(ii) an inner barrier layer which forms an internal surface of the supply pipe and which is formed from a first polymeric plastics material;
(iii) an outer containment pipe;
(iv) a plurality of passages associated with the secondary containment pipe, said passages being adapted to receive any fluid which has leaked from the inner supply pipe and to convey said fluid to a remote leak detector.

This arrangement provides for the first time a lightweight, integral secondarily-contained pipe with passageways designed to channel any leaked fluid to a remote leak detector.

Preferably the plurality of passages is formed by a foam. This provides significant weight reduction. In a particularly preferred embodiment the foam, the outer containment pipe and the inner supply pipe are formed from the same, second polymeric plastics material.

In a further preferred embodiment the foam is an open-celled foam adapted to encourage the flow of any leaked fluid along the pipe.

Preferably the foam is resiliently compressible. Thus, when the pipe is bent into a tight radius the foam can give and allow some relative movement of the inner supply pipe with respect to the outer containment pipe.

Preferably the foam comprises a polymeric material.

Alternatively the foam comprises a silicone foam. The choice of foam will be made by the materials specialist and will depend, in part, on the other plastics material used in the pipe.

In an alternative embodiment the outer containment pipe incorporates a series of tubular passages extending along the longitudinal axis of the pipe and angularly spaced from each other about the circumference of the supply pipe.

Preferably the plurality of passages are formed from a convoluted wall extending between the inner supply pipe and the outer containment pipe and extending substantially the length of the pipe.

Preferably the convoluted wall is substantially corrugated, corrugations providing a particularly favourable weight to strength ratio.

Preferably alternate corrugations contact the inner supply pipe and the outer containment pipe, forming a series of substantially parallel passages extending substantially the length of the pipe.

In a particularly preferred embodiment the inner supply pipe, inner barrier layer, outer containment pipe and plurality of passages are formed by a process of co-extrusion.

The inner barrier layer may comprise a plastics material selected from the group comprising:
Nylon 612
Polyamides
Polyamides 6, 11 or 12
Polyethylene terphthalate
Polyvinyl chloride
Polyvinylidene chloride or fluoride
Polypropylene
Ethylene/vinyl alcohol copolymers
the selection being based on the nature of the fluid being conveyed.

The outer containment pipe may comprise a plastics material selected from he group comprising:
Polyethylene
Polypropylene
Polyvinyl chloride By way of example, there is provided a pipe for conveying organic fluids, for example petroleum products such as petrol, the pipe comprising a one-piece wall means having an inner surface which defines a first passage for said fluids, the wall means also including further passage means which is integrally formed with the wall means and extends along the length of pipe, the further passage means being arranged to receive any fluid which has leaked from the first passage and to enable detection of the leaked fluid at a position remote from the leak site.

Thus, the detection of leaks can be achieved using a detection system connected to the further passage means without the need for any secondary containment of the pipe.

Preferably, the further passage means substantially surrounds said first passage, to ensure that fluid from leaks at any angular position from the first passage is received by the further passage means.

Preferably, the pipe is formed from a single extrusion.

The further passage means may comprise a series of elongate passages angularly spaced from each other about the first passage. Preferably, however, the wall means comprises an inner wall integrally formed with an outer wall and with one spacer means separating the inner and outer walls to define therebetween an annular space which constitutes, or contains, said further passage means.

The spacer means may conveniently comprise a foam which also constitutes a further passage means. To that end, the foam is preferably of an open-celled structure.

Preferably, the foam is resiliently compressible. This is particularly advantageous because the foam then enables the pipe to be relatively flexible, the foam maintaining spacing between inner and outer walls even if the pipe is flexed.

Preferably, the inner wall, outer wall and foam are all formed by a process of co-extrusion, the walls being formed from a polymeric material such as polyethylene. The foam preferably also comprises a polymeric material. Alternatively, a silicone foam may be used.

Preferably, the inner surface of the pipe is lined with a skin, for example, a polyamide such as nylon, which acts as a barrier to the diffusion of liquid from the first passage. Conveniently, the skin is formed by co-extrusion with the other parts of the pipe.

The invention also lies in a petroleum forecourt installation comprising a storage tank connected to a dispensing pump through one or more pipes, each manufactured in accordance with the first aspect of the invention.

BRIEF DESCRIPTION OF THE DRAWINGS

The invention will now be described, by way of example only, with reference to the accompanying drawings in which.

DETAILED DESCRIPTION

Figure 1:
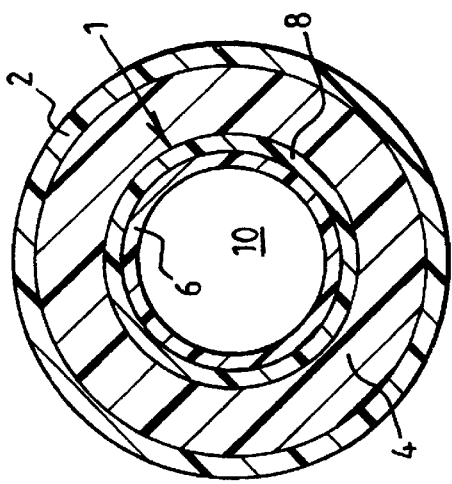
FIG. 1 is a sectional view of a pipe in accordance with the invention.

With reference to FIG. 1, a pipe in accordance with the invention is formed from polyolefines, and comprises a supply pipe means 1 separated from an outer protective layer 2 by an intermediate layer of open-celled foam 4. The supply pipe means 1 comprises an inner barrier layer or cylindrical skin or coating 6 of nylon or a nylon derivative which is supported by an inner supply pipe or cylindrical support layer 8 of polyethylene having a modulus in the range 100–4000 MPa. Alternative construction materials are discussed below.

The skin or coating 6 lines the central passage 10 through which petrol is to be conveyed. The layer 6 is constructed from material which is substantially impervious to petrol, and thus presents a barrier to the diffusion of petrol through the inner layer means 1. The layer 6 is advantageous because the polyethylene layer 8, although showing some resistance towards the diffusion of petrol, does exhibit some permeability thereto.

The foam, which is also formed from polyethylene the modulus of which is in the range of 100–4000 MPa, fills the space between the layer 8 and the layer 2 and is sufficiently resilient to provide support which maintains spacing between those layers. The layer 2 is formed from solid polyethylene which is also of a modulus of 100–4000 MPa.

The thicknesses of the various layers of the pipe will, at least in part, be dependent on the size or diameter of the pipe. For example, in a SDR4 (Standard Diameter Ratio) pipe, having an external diameter of 63 mm (and maximum thickness of 6.5 mm) the thicknesses of each of the skin or coating 6 and the layer 8 lie in the range of 0.01–6.4 mm, that of the foam can be in the range 0.5–6.4 mm whilst the outer layer 2 can have a thickness of between 0.01–6.4 mm.

The pipe 1 has a degree of flexibility which facilitates storage (for example in a coiled form) and installation. However, the resilient support provided by the foam 4 helps to maintain spacing between the inner layer means 1 and outer layer 2 even if the pipe is flexed. The layers of the pipe are formed by a process of co-extrusion so that the pipe is of an integral, one-piece construction.

Open celled foam structures are formed in a variety of ways. In the extruder an agent is placed into the barrel of the extruder which creates a reaction that foams the basic polymer. Polymer types that are most commonly used for foaming are LDPE (Low-density polyethylene) and EVA (Ethylene Vinyl Acetate). Polyurethanes can be used for foaming as well, however they are not entirely suitable for extruding but excellent for moulding.

The percentage of open cell characteristics can be from 100%–0% depending on the agent used to produce the reaction and the die design.

The agents used to create the reactions are preferably Azo dicarbonamide compounds with levels of 1–1.5%. Foams can be created with densities ranging from 0.02–0.6 kg/m$^3$ (Closed cell) and open cell of 0.4–0.8 kg/m$^3$.

Other agents for producing foamed structures include:
Oxybisulphonamide compounds
Sodium Citrate
Sodium Bicarbonate
Methyl Pentane It is intended that this invention should encompass both open and closed cell foam. These can be formed from any suitable material as selected by the materials specialist and formed by any one of a variety of known techniques.

In FIG. 1 the outer layer of the secondary containment system is shown as a discrete layer with an inner and an outer surface. This is not necessarily the case and is only one example of what might be possible.

For example, a process may be used as described in U.S. Pat. No. 4,644,977(Gates Rubber Company), the entire text of which is incorporated herein by reference and is intended to form an integral part of this disclosure. It follows that there need not be discrete layers or separation between the foamed inner region and unfoamed outer region. They may simply merge into each other with the degree of foaming tending towards substantially zero towards the outer region of the pipe.

It will be observed in FIG. 1 that the inner supply pipe 1,6 and the outer secondary containment layers are shown as substantially concentric or co-axial. However, this is not strictly necessary and any arrangement of a pipe within a pipe will suffice. Thus the terms "concentric" and "co-axial" have very broad meanings in this context.

Figure 2:
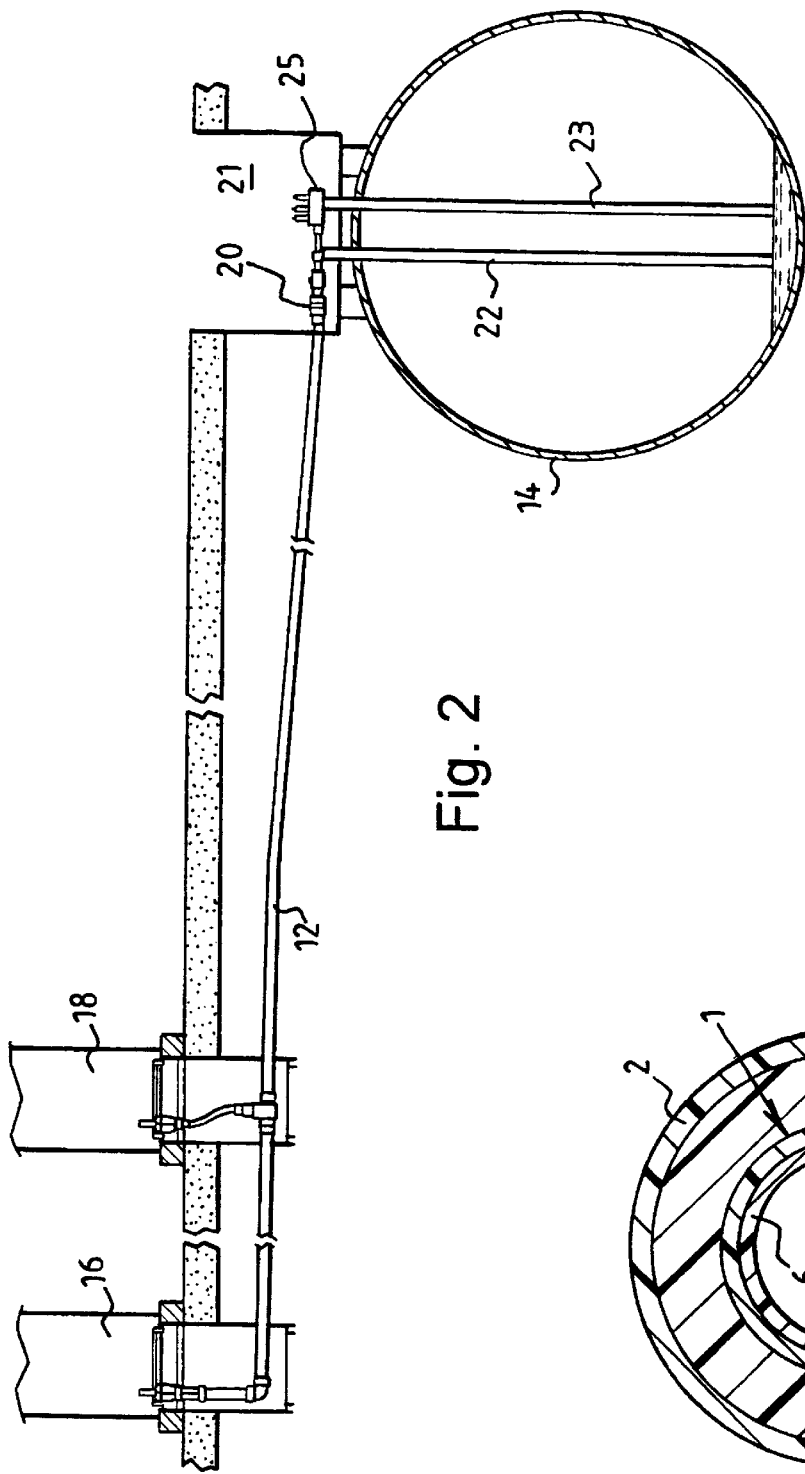
FIG. 2 is a diagrammatic cut-away view of part of a petroleum forecourt installation which includes a pipeline formed from a series of pipes of the type shown in FIG. 1.

Referring to FIG. 2, the pipe shown in FIG. 1 is one of a plurality of identical pipes which form a pipeline 12 connecting a subterranean fuel storage tank 14 to dispensers 16 and 18 which include suction pumps (not shown). The pipeline 12 is inclined so that the end adjacent the dispensers 16 and 18 is higher than the end adjacent the tank 14. The pipes are contiguously arranged and, where necessary, may be joined together by a process of Electro-fusion jointing which provides leak-proof joints between adjacent pipes. However, joints other than at manholes or in chambers are to be avoided. At the upstream end of the pipeline 12, at or near the lowest point, in a manhole chamber 21 above the tank 14, there is provided a leak detection sensor 20 which is situated downstream of a suction line 22 which extends into the tank 14, to allow the pumps 16 and 18 to draw fuel from the tank 14 and along the pipeline 12.

FIG. 2 also depicts a pressure line 23, which forms part of an alternative form of fuel supply system. That system is known as a pressure system and uses a pump 25, at the top of the line 23, to supply fuel along the pipeline 21. In a pressure system, the pump such as the pump 25 replaces the suction pumps in the dispensers 16 and 18.

In this example, the detector 20 comprises a reservoir (not shown) which communicates with the foam layers of the pipeline 12 and contains a float level switch (not shown).

Any fuel which leaks from within the central passage of one of the pipes in the line 12 is captured by the foam layer of that pipe. It can be seen from FIG. 2 that the pipeline 12 is downwardly inclined from the pumps 16 and 18 to the sensor 20. Consequently, the leaked fuel will tend to flow through the foam layer of the pipeline until it flows into the reservoir in the sensor 20 and, ultimately, triggers the float level switch. An example of a leak detecting device such as the sensing means 20 is shown in GB-A-2304221.

The pipeline 12 can be fitted with an alternative form of leak detection system, for example one which pumps an inert gas, such as nitrogen, through the foam layers of the pipeline 12, so as to displace petroleum vapour from any leaks to a suitable gas detector at the end of the pipeline 12.

Alternative flexible pipes according to the present invention will now be described.

Figure 3:
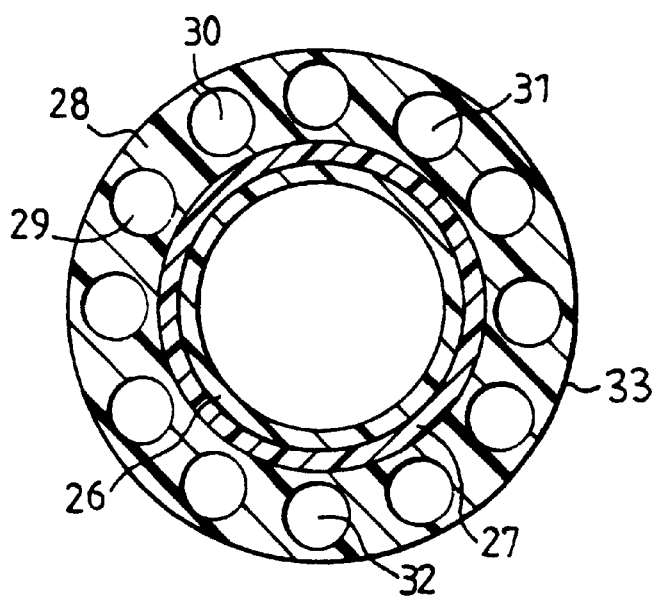
FIGS. 3 and 4 are sectional end views of alternative embodiments of pipe, each in accordance with the invention.

The pipe shown in FIG. 3 is a three-layered co-extrusion having an inner nylon skin 26 corresponding to the skin 6 of the pipe shown in FIG. 1. The pipe also has a polyethylene inner layer or inner supply pipe 27 interposed between the skin and a solid polyethylene wall 28. Optionally, instead of having an annular foam-filled space, the pipe has twelve identical, equi-angularly spaced cylindrical passages such as passages 29–32 which are incorporated into the wall 28, and which run along the length of the pipe. Those passages constitute the plurality of passages which can receive any petrol which leaks through a breach in the skin 26 and can convey the leaked petrol to a remote sensing device in a similar fashion to the pipe shown in FIG. 1.

There are certain important features concerning this embodiment. In FIG. 3 the outer, secondary layer 28 maybe uniform except for the passageways 29–32. This need not be the case, for example, the inner body 28 of the secondary pipe is foamed, which further assists the passage of fluid into the passageways 29–32.

Since layer 28 is foamed it has an unfoamed region or discrete layer 33 which serves as an outer skin around the outer circumference of the pipe. This will act as a protective layer or skin when the pipe is buried.

Figure 4:
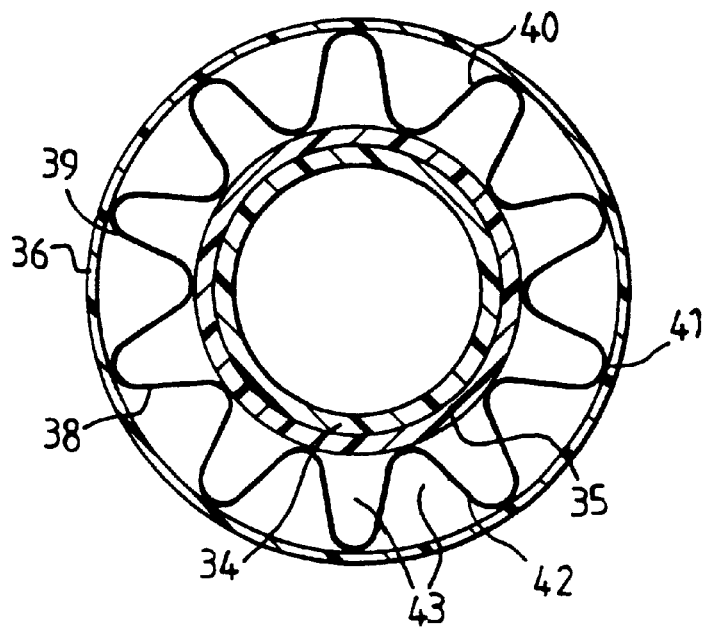

The pipe shown in FIG. 4 is also a co-extrusion having an inner nylon skin 34 and polyethylene wall 35. However, in this case, the wall for the pipe comprises a solid outer polyethylene layer 36 spaced from the skin 34 by a series of corrugations, for example, 38–42 which extend radially from the skin 34 to the layer 36 and define axial channels 43 extending along the length of the pipe, These channels provide the further passage means of this embodiment of pipe.

Corrugations are just one way of forming the passageways in this embodiment. In fact, any convoluted wall extending between the inner supply pipe 35 and the outer containment pipe 36 could be employed.

The corrugated version is formed through the die design of the tool. This is similar to the product with holes in it. The only difference is that the holes are bigger and shaped differently. The materials can again be any plastic materials that can be extruded.

The terms corrugated and convoluted have very broad meanings in this context. They refer to any curvi-linear partition between the inner supply pipe and outer containment pipe. It is not necessary that the corrugations or convolutions touch the pipe walls at every approach. In fact, there may be positive advantages to leaving spaces at alternate corrugations.

In the illustrated example, the pipe is of 63 mm in diameter, the thickness of each of the inner and outer layers 34 and 36 is in the range 0.25 mm to 5 mm and the thickness of the web forming the corrugations is in the range 0.5 mm to 4 mm.

The relative thicknesses of the various layers can vary according to particular application. The example given below is for the case where petroleum products are to be conveyed by the pipe. In this case, the preferred inner barrier material must have very low permeability to petroleum spirit and the various chemicals found in petrol and diesel fuels. Nylon 612 is one of the preferred materials. However, other materials can be used and these include polyamides, polyamides 6, 11 or 12, polyethylene terphthalate, polyvinyl chloride, polyvinylidene chloride or fluoride, polypropylene, ethylene/vinyl alcohol copolymers, or mixtures thereof, the selection being based on the nature of the fluid being conveyed.

This selection is not intended to be limiting but rather demonstrates the flexibility and breadth of the invention. The plastics material with the lowest permeability to the fluid in question will usually be chosen. Furthermore, it is known to use blends of two or more polymers and this invention extends to cover known and yet to be developed blends of plastics material.

Preferably the outer protective layer comprises a plastics material selected from the group comprising:

Polyethylene

Polypropylene

Polyvinyl chloride or variations and combinations of plastics material specified for the inner barrier layer.

In a particularly preferred embodiment the inner layer comprises Nylon 612 or polyvinylidene fluoride and the outer layer comprises linear low density polyethylene. The choice would be made on the basis of the permeability through the polymer of the material to be conveyed.

The relative proportions and thicknesses of the two layers are important to the performance of the pipe. For petroleum based products, permeability should preferably be zero. However, as all plastics are permeable to a degree, a suitable commercially applicable range is 0.2–4 $g/m^2/day$.

In the example where a pipe of 110 mm diameter is intended for petroleum applications, then the thickness of the wall of the supply pipe is typically in the order of 7 mm. Of this the inner nylon layer can be from 0.01 mm to 6.99 mm. Conversely, the outer polyethylene layer could be of a thickness of 0.01 to 6.99 mm.

In a preferred embodiment the nylon layer is 0.05 mm and the polyethylene layer is 6.95 mm thick.

In certain cases adhesive is provided between the two layers. Once again, the adhesive can take a variety of forms and will depend largely on the inner and outer polymers or the polymers being joined. One example of a suitable adhesive is maleic anhydride modified polyethylene. Alternatively, it can take the form of a polymer blend of the two polymers to be joined.

Pipes according to the present invention can be used to carry a wide variety of fluids, which term includes both gases and liquids.

What is claimed is:

1. A flexible piping system for conveying a fluid, said piping system being constructed from a plastic material and comprising:
   (i) an inner pipe layer which defines a first passage for conveying said fluid;
   (ii) an inner barrier layer which forms an internal surface of the inner pipe layer;
   (iii) an outer protective pipe layer; and
   (iv) an intermediate foam layer located between the inner pipe layer and the outer protective layer;
   wherein the intermediate foam layer incorporates a plurality of longitudinal passageways extending substantially entirely along the axial length of the pipe.

2. A flexible piping system as claimed in claim 1 wherein the piping system is of unitary, one-piece construction.

3. A flexible piping system as claimed in claim 2 wherein the inner supply pipe, inner barrier layer, outer protective pipe layer and intermediate foam layer are formed by a process of co-extrusion.

4. A flexible piping system as claimed in claim 1 wherein the intermediate foam layer comprises an open-celled foam.

5. A flexible piping system as claimed in claim 4 wherein the intermediate open-celled foam layer has a density of 0.4–0.8 kg/m3.

6. A flexible piping system as claimed in claim 1 wherein the intermediate foam layer comprises a resiliently compressible foam.

7. A flexible piping system as claimed in claim 1 wherein the inner barrier layer comprises a plastic material selected from the group comprising consisting of Nylon 612, Polyamides, Polyamides 6, 11, or 12, Polyethylene terphthalate, Polyvinyl chloride, Polyvinylidene chloride or fluoride, Polypropylene, and Ethylene vinyl alcohol copolymers, the selection being based on the nature of the fluid being conveyed.

8. A flexible piping system as claimed in claim 1 wherein the inner pipe layer and the outer protective pipe layer may comprise a plastics material selected from the group consisting of: Polyethylene, Polypropylene, and Polyvinyl chloride.

9. A flexible piping system as claimed in claim 1 wherein the inner barrier layer comprises a member selected from the group consisting of: Nylon 612 and Polyvinylidene fluoride and the inner pipe layer and outer protective layer comprise linear low density polyethylene.

10. A petroleum forecourt installation comprising a fuel storage tank connected to a dispensing pump through at least one pipe, said pipe being constructed from plastic material and comprising:
   (i) an inner pipe layer which defines a first passage for conveying said fluid;
   (ii) an inner barrier layer which forms an internal surface of the inner pipe layer;
   (iii) an outer protective pipe layer; and
   (iv) an intermediate foam layer located between the inner pipe layer and the outer protective layer,
   wherein the intermediate foam layer incorporates a plurality of longitudinal passageways extending substantially entirely along the axial length of the pipe.

* * * * *